(12) United States Patent
Howe et al.

(10) Patent No.: US 10,554,397 B2
(45) Date of Patent: Feb. 4, 2020

(54) QUANTUM-BASED DATA ENCRYPTION

(71) Applicant: The Boeing Company, Chicago, IL (US)

(72) Inventors: Wayne R. Howe, Irvine, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 15/717,857

(22) Filed: Sep. 27, 2017

(65) Prior Publication Data

US 2019/0097792 A1   Mar. 28, 2019

(51) Int. Cl.
*H04L 9/00* (2006.01)
*H04L 9/08* (2006.01)

(52) U.S. Cl.
CPC .................. *H04L 9/0852* (2013.01)

(58) Field of Classification Search
CPC .................................................. H04L 9/0858
USPC .................................................. 713/168–174
See application file for complete search history.

(56) References Cited

U.S. PATENT DOCUMENTS

| | | | |
|---|---|---|---|
| 7,418,737 B2 * | 8/2008 | Grupe | H04L 63/0428 705/51 |
| 2006/0002563 A1 * | 1/2006 | Bussieres | H04L 9/0852 380/278 |
| 2013/0051800 A1 | 2/2013 | Soto Rodriguez et al. | |
| 2018/0309571 A1 * | 10/2018 | Arora | H04L 63/1475 |
| 2019/0103962 A1 | 4/2019 | Howe et al. | |

OTHER PUBLICATIONS

Haitjema, Mart, "A Survey of the Prominent Quantum Key Distribution Protocols," accessed from http://www.cse.wustl.edu/~jain/cse571-07/ftp/quantum/ on Dec. 14, 2017, pp. 1-12.

* cited by examiner

*Primary Examiner* — Longbit Chai
(74) *Attorney, Agent, or Firm* — Kunzler Bean & Adamson (57) ABSTRACT

A system that comprises a quantum key device configured to generate quantum information and transmit the quantum information over a first and second quantum communication channel. The system also comprises a first device, communicatively coupled to the quantum key device over the first quantum communication channel, and a second device, communicatively coupled to the quantum key device over the second quantum communication channel. The system further comprises an encryption module configured to encrypt data to create encrypted data, at the first device, using a first quantum encryption key. The system also comprises a decryption module configured to decrypt the encrypted data to create decrypted data, at the second device, using a second quantum encryption key. The first quantum encryption key is the same as the second quantum encryption key. The system further comprises a termination module configured to prevent access to the decrypted data after a predetermined period of time.

18 Claims, 5 Drawing Sheets

QUANTUM-BASED DATA ENCRYPTION

FIELD

This disclosure relates generally to quantum key encryption, and more particularly to securely encrypting, decrypting, and preventing access to decrypted data after a predetermined period of time.

BACKGROUND

Conventional cryptography systems necessitate the sharing of encryption keys and/or encryption key information between different parties to encrypt and decrypt data. Sharing key information can be dangerous because eavesdroppers may intercept the key information, which may subsequently be used to decrypt encrypted data that is also intercepted. Furthermore, even if an eavesdropper does not intercept the encrypted data and/or the key information, once the encrypted data is decrypted on a recipient's device, it typically remains accessible on the recipient's device for an indefinite amount of time. The decrypted information may be stored on the recipient's device in a vulnerable area where it can be misappropriated by an unauthorized third party.

SUMMARY

The subject matter of the present application has been developed in response to the present state of the art, and in particular, in response to the problems and disadvantages associated with conventional data encryption security systems. Accordingly, the subject matter of the present application has been developed to provide a data encryption security system that overcomes at least some of the above-discussed shortcomings of prior art techniques.

Described herein is a system that comprises a quantum key device configured to generate quantum information and transmit the quantum information over a first quantum communication channel and a second quantum communication channel. The system also comprises a first device communicatively coupled to the quantum key device over the first quantum communication channel. The system additionally comprises a second device communicatively coupled to the quantum key device over the second quantum communication channel. The system further comprises an encryption module configured to encrypt data to create encrypted data, at the first device, using a first quantum encryption key. The first quantum encryption key is derived at the first device from quantum information received over the first quantum communication channel. The system also comprises a decryption module configured to decrypt the encrypted data to create decrypted data, at the second device, using a second quantum encryption key. The second quantum encryption key is derived at the second device from quantum information received over the second quantum communication channel. The first quantum encryption key is the same as the second quantum encryption key. The system further comprises a termination module configured to prevent access to the decrypted data after a predetermined period of time. At least a portion of the modules include one or more of hardware circuits, programmable hardware devices, and executable code. The executable code is stored on one or more computer readable storage media. The preceding subject matter of this paragraph characterizes example 1 of the present disclosure.

The system further comprises a third device communicatively coupled to the second device. The decrypted data is transmittable to the third device from the second device. The decrypted data is accessible on the third device for the predetermined period of time. The preceding subject matter of this paragraph characterizes example 2 of the present disclosure, wherein example 2 also includes the subject matter according to example 1, above.

The termination module is further configured to cease transmission of the quantum information over the first and second quantum communication channels after the predetermined period of time. The preceding subject matter of this paragraph characterizes example 3 of the present disclosure, wherein example 3 also includes the subject matter according to any one of examples 1 or 2, above.

The encrypted data is transmitted over a standard communication channel that is separate from the first and second quantum communication channels. The preceding subject matter of this paragraph characterizes example 4 of the present disclosure, wherein example 4 also includes the subject matter according to any one of examples 1-3, above.

The termination module prevents access to the decrypted data after the predetermined period of time by deleting the decrypted data. The preceding subject matter of this paragraph characterizes example 5 of the present disclosure, wherein example 5 also includes the subject matter according to any one of examples 1-4, above.

The termination module prevents access to the decrypted data after the predetermined period of time by overwriting the decrypted data with different data. The preceding subject matter of this paragraph characterizes example 6 of the present disclosure, wherein example 6 also includes the subject matter according to any one of examples 1-5, above.

The quantum information comprises a stream of entangled quantum particles such that when a state of a quantum particle of an entangled set of quantum particles is read, corresponding states of other quantum particles in the entangled set of quantum particles are determinable. The preceding subject matter of this paragraph characterizes example 7 of the present disclosure, wherein example 7 also includes the subject matter according to any one of examples 1-6, above.

The termination module is further configured to prevent access to the first and second quantum encryption keys after the first and second quantum encryption keys are used to create the encrypted data and decrypt the encrypted data on the first and second devices. The termination module overwrites at least a portion of the first and second quantum encryption keys. The preceding subject matter of this paragraph characterizes example 8 of the present disclosure, wherein example 8 also includes the subject matter according to any one of examples 1-7, above.

The system further comprises an error module configured to detect an error in the quantum information transmitted over one of the first and second quantum communication channels. The error indicates that the quantum information transmitted over one of the first and second quantum communication channels has been misappropriated. The preceding subject matter of this paragraph characterizes example 9 of the present disclosure, wherein example 9 also includes the subject matter according to any one of examples 1-8, above.

The error module detects an error in the quantum information received at one of the first and second devices over the first and second quantum communication channels by comparing at least a portion of the first and second quantum encryption keys. The preceding subject matter of this paragraph characterizes example 10 of the present disclosure, wherein example 10 also includes the subject matter according to example 9, above.

Further described herein is an apparatus that comprises an encryption module configured to encrypt data to create encrypted data, at a first device, using a first quantum encryption key. The first quantum encryption key is derived at the first device from quantum information received over a first quantum communication channel from a quantum key device. The first device is communicatively coupled to the quantum key device over the first quantum communication channel. The apparatus also comprises a decryption module configured to decrypt the encrypted data to create decrypted data, at a second device, using a second quantum encryption key. The second quantum encryption key is derived at the second device from quantum information received over a second quantum communication channel. The second device is communicatively coupled to the quantum key device over the second quantum communication channel. The first quantum encryption key is the same as the second quantum encryption key. The apparatus additionally comprises a termination module configured to prevent access to the decrypted data after a predetermined period of time. The preceding subject matter of this paragraph characterizes example 11 of the present disclosure.

The decrypted data is transmittable to a third device that is communicatively coupled to the second device. The decrypted data is accessible on the third device for the predetermined period of time. The preceding subject matter of this paragraph characterizes example 12 of the present disclosure, wherein example 12 also includes the subject matter according to example 11, above.

The termination module ceases transmission of the quantum information over the first and second quantum communication channels after the predetermined period of time. The preceding subject matter of this paragraph characterizes example 13 of the present disclosure, wherein example 13 also includes the subject matter according to any one of examples 11 or 12, above.

The encrypted data is transmitted over a standard communication channel that is separate from the first and second quantum communication channels. The preceding subject matter of this paragraph characterizes example 14 of the present disclosure, wherein example 14 also includes the subject matter according to any one of examples 11-13, above.

The termination module prevents access to the decrypted data after the predetermined period of time by one of: deleting the decrypted data and overwriting the decrypted data with different data. The preceding subject matter of this paragraph characterizes example 15 of the present disclosure, wherein example 15 also includes the subject matter according to any one of examples 11-14, above.

The decrypted data is stored in volatile memory while the decrypted data is used without storing the decrypted data in non-volatile memory. The preceding subject matter of this paragraph characterizes example 16 of the present disclosure, wherein example 16 also includes the subject matter according to any one of examples 11-15, above.

The termination module is further configured to prevent access to the first and second quantum encryption keys after the first and second quantum encryption keys are used to create the encrypted data and decrypt the encrypted data on the first and second devices. The termination module overwrites at least a portion of the first and second quantum encryption keys. The preceding subject matter of this paragraph characterizes example 17 of the present disclosure, wherein example 17 also includes the subject matter according to any one of examples 11-16, above.

The apparatus further comprises an error module configured to detect an error in the quantum information transmitted over one of the first and second quantum communication channels. The error indicates that the quantum information transmitted over one of the first and second quantum communication channels has been misappropriated. The preceding subject matter of this paragraph characterizes example 18 of the present disclosure, wherein example 18 also includes the subject matter according to any one of examples 11-17, above.

The error module detects an error in the quantum information received at one of the first and second devices over the first and second quantum communication channels by comparing at least a portion of the first and second quantum encryption keys. The preceding subject matter of this paragraph characterizes example 19 of the present disclosure, wherein example 19 also includes the subject matter according to example 18, above.

Additionally, described herein is a method that comprises encrypting data to create encrypted data, at a first device, using a first quantum encryption key. The first quantum encryption key is derived at the first device from quantum information received over a first quantum communication channel from a quantum key device. The first device is communicatively coupled to the quantum key device over the first quantum communication channel. The method also comprises decrypting the encrypted data to create decrypted data, at a second device, using a second quantum encryption key. The second quantum encryption key is derived at the second device from quantum information received over a second quantum communication channel. The second device is communicatively coupled to the quantum key device over the second quantum communication channel. The first quantum encryption key is the same as the second quantum encryption key. The method further comprises preventing access to the decrypted data after a predetermined period of time. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Some embodiments of the present disclosure provide quantum-based data encryption systems that utilize quantum computing and quantum data to generate the same encryption keys at different devices using quantum information received over quantum communication channels, detect eavesdroppers on the quantum communication channels, encrypt and decrypt data using the encryption keys, and securely prevent access to the decrypted data after a predetermined period of time.

Figure 1:
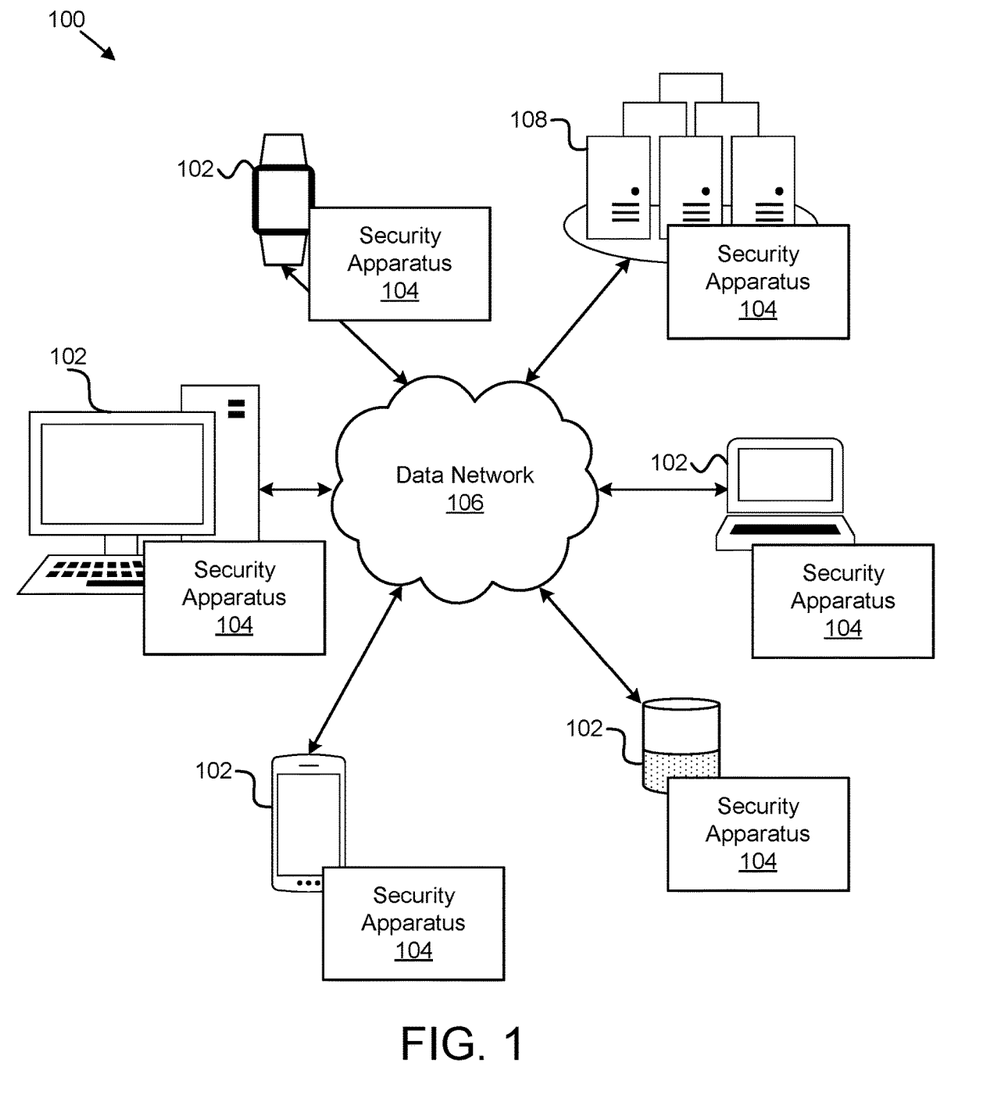
FIG. 1 is a schematic block diagram of a system for quantum-based data encryption, according to one or more examples of the present disclosure.

FIG. 1 is a schematic block diagram illustrating one embodiment of a system 100 for quantum-based data encryption. The system 100 includes one or more information handling devices 102, one or more security apparatuses 104, one or more data networks 106, and one or more servers 108. Even though a specific number of information handling devices 102, security apparatuses 104, data networks 106, and servers 108 are depicted in FIG. 1, one of skill in the art will recognize, in light of this disclosure, that any number of information handling devices 102, security apparatuses 104, data networks 106, and servers 108 may be included in the system 100.

The information handling devices 102 may include one or more of a desktop computer, a laptop computer, a tablet computer, a smart phone, a smart speaker (e.g., Amazon Echo, Google Home, Apple HomePod), a security system, a set-top box, a gaming console, a smart TV, a smart watch, a fitness band or other wearable activity tracking devices, an optical head-mounted display (e.g., a virtual reality headset, smart glasses, or the like), a High-Definition Multimedia Interface ("HDMI") or another electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In one embodiment, the one or more information handling devices 102 include quantum computing devices that are configured to generate, transmit, and/or receive quantum data over quantum communication channels, e.g., data networks 106 that are designed to carry quantum information such as fiber optic networks for carrying photons. As used herein, quantum computing refers to systems that use quantum-mechanical phenomena, e.g., entanglement, to perform data operations using quantum bits, e.g., superpositions of states. In such an embodiment, the quantum data or quantum information that is generated and transmitted by the quantum computing devices comprises quantum bits (qubits) that represent atoms, ions, photons, electrons, or the like. As described herein, the quantum computing devices may be configured to generate quantum data (qubits) that are used for quantum cryptography such as quantum key distribution. For instance, a quantum computing device may transmit photons that have a number of states such that when a photon is measured, the measured state may be encoded as a portion of an encryption key, e.g., a one or a zero.

Thus, quantum key distribution, as used herein, enables two or more parties to produce a shared random secret key, e.g., a quantum encryption key, known only to them, which can be used to encrypt and decrypt data. In certain embodiments, quantum entanglement may be used to generate the same encryption keys at different devices without sharing cryptographic information between the devices. As used herein, quantum entanglement refers to the phenomena that pairs or groups of particles, e.g., photons, are generated or interact in ways such that the quantum state of each particle cannot be described independently of the others, even when the particles are separated by a large distance. Thus, when the state of an entangled photon is read at a first device, the state of the corresponding entangled photon can be determined at the second device at substantially the same time, which is illustrated in more detail below.

In some embodiments, an important and unique property of quantum key distribution is the ability of two communicating users to detect the presence of a third party attempting to gain knowledge of the key. This results from a fundamental aspect of quantum mechanics that the process of measuring a quantum system in general disturbs the system. In other words, a third party trying to eavesdrop on the key must in some way measure it, thus introducing detectable anomalies.

By using quantum entanglement, for instance, a system can be designed that detects eavesdropping, and if the level of eavesdropping is below a predetermined threshold, then a quantum encryption key can be generated that is determined to be secure. Otherwise, it can be determined that the quantum encryption key has been misappropriated, and the communication should be terminated. One of skill in the art, in light of this disclosure, will have an understanding of the mechanics of quantum computing and its applicability to data encryption.

In certain embodiments, the information handling devices 102, including the quantum computing devices, are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include hardware and executable code, functions, instructions, operating systems, and/or the like for transmitting, receiving, and interpreting quantum information for data encryption.

In one embodiment, the security apparatus 104 is configured to encrypt data, at a first device, using a quantum encryption key that is generated using quantum information received at the first device over a quantum communication channel. In further embodiments, the security apparatus 104 is configured to decrypt the encrypted data at a second device using a quantum encryption key that is generated using quantum information received at the second device over a quantum communication channel. The security apparatus 104, in various embodiments, is configured to prevent access to the decrypted data after a predetermined period of time. The security apparatus 104, including its various sub-modules, may be located on one or more information handling devices 102 and/or quantum computing devices in the system 100, one or more servers 108, one or more network devices, and/or the like. The security apparatus 104 is described in more detail below with reference to FIG. 2.

In one embodiment, the security apparatus 104 provides a solution over conventional encryption systems by, first, generating quantum encryption keys separately at the data sender and data recipient devices using quantum information received over quantum communication channels, which allows the data to be encrypted and decrypted without sharing the encryption key over standard communication protocols. Second, after the encrypted data has been decrypted, the decrypted data is available only for a predetermined or predefined period of time. Thereafter, the security apparatus 104 prevents access to the decrypted data on the recipient's device by deleting the data, overwriting the data, storing the data in a secure location, and/or the like. Moreover, the security apparatus 104 deletes the quantum encryption keys after they are used to encrypt and decrypt the data so that the quantum encryption keys cannot be misappropriated.

In various embodiments, the security apparatus 104 may be embodied as a hardware appliance that can be installed or deployed on an information handling device 102, e.g., a quantum computing device, on a server 108, or elsewhere on the data network 106. In certain embodiments, the security apparatus 104 may include a hardware device such as a secure hardware dongle or other hardware appliance devices (e.g., a set-top box, a network appliance, or the like) that attaches to a device such as a quantum computing device, a laptop computer, a server 108, a tablet computer, a smart phone, a security system, or the like, either by a wired connection (e.g., a universal serial bus ("USB") connection) or a wireless connection (e.g., Bluetooth, Wi-Fi, near-field communication ("NFC"), or the like); that attaches to an electronic display device (e.g., a television or monitor using an HDMI port, a DisplayPort port, a Mini DisplayPort port, Video Graphics Array (VGA) port, Digital Visual Interface (DVI) port, or the like); and/or the like. A hardware appliance of the security apparatus 104 may include a power interface, a wired and/or wireless network interface, a graphical interface that attaches to a display, and/or a semiconductor integrated circuit device as described below, configured to perform the functions described herein with regard to the security apparatus 104.

The security apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the security apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security apparatus 104.

The semiconductor integrated circuit device or other hardware appliances of the security apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliances of the security apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth network, a near-field communication ("NFC") network, an ad hoc network, and/or the like. The data network 106 may include a wide area network ("WAN"), a storage area network ("SAN"), a local area network (LAN), an optical fiber network, the internet, or another digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The data network 106 may include components for transmitting quantum computing information that may include photons, ions, electrons, and/or the like. Various quantum networking components may include fiber optic links, few-space links, optical cavities, quantum repeaters, and/or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials (ASTM), the DASH? Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification ("IrPHY") as defined by the Infrared Data Association ("IrDA"). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, File Transfer Protocol (FTP) servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
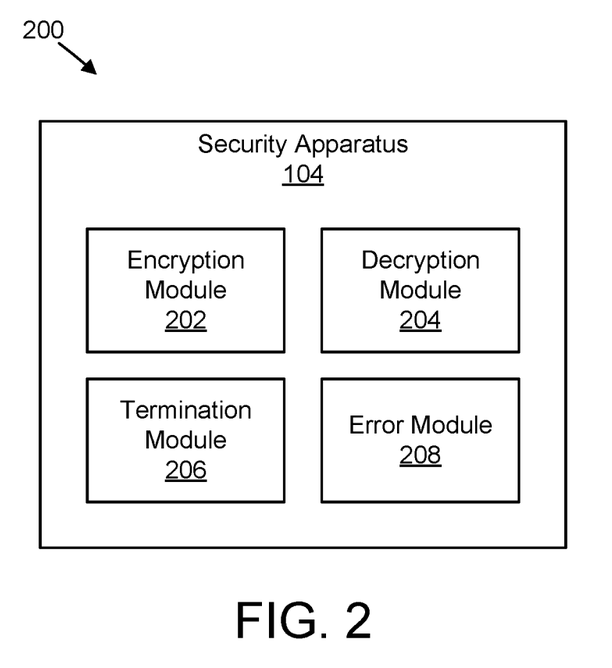
FIG. 2 is a schematic block diagram of an apparatus for quantum-based data encryption, according to one or more examples of the present disclosure.

FIG. 2 depicts one embodiment of an apparatus 200 for quantum-based data encryption. In one embodiment, the apparatus 200 includes an embodiment of a security apparatus 104. The security apparatus 104, in certain embodiments, includes one or more of an encryption module 202, a decryption module 204, a termination module 206, and an error module 208, which are described in more detail below.

The encryption module 202, in one embodiment, is configured to encrypt data to create encrypted data, at a first device (e.g., a sender device), using a first quantum encryption key. The encryption module 202, in certain embodiments, derives, creates, generates, or the like the first quantum encryption key using quantum information received over a first quantum communication channel. In such an embodiment, the first device is communicatively coupled to a quantum key device that transmits quantum information over the first quantum communication channel.

The decryption module 204, in one embodiment, is configured to receive the encrypted data, at a second device (e.g., a recipient device) and decrypt the encrypted data to create decrypted data. In certain embodiments, the decryption module 204 decrypts the encrypted data using a second quantum encryption key that is derived, created, generated, or the like using quantum information received over a second quantum communication channel. In such an embodiment, the second device is communicatively coupled to the quantum key device that transmits quantum information over the second quantum communication channel.

Thus, in certain embodiments, the first device and the second device are communicatively coupled to the same quantum key device and receive quantum information simultaneously and/or continuously from the quantum key device. For instance, the quantum key device may be located in the cloud, or another remote location, and is communicatively coupled to the first and second devices over quantum communication channels. The quantum key device may continuously transmit quantum information to the first and second devices, which the encryption module 202 and the decryption module 204 can tap into to generate encryption keys. In another embodiment, the quantum key device transmits quantum key information on demand in response to a request from the encryption module 202 and/or the decryption module 204.

In certain embodiments, the quantum information comprises entangled particles, e.g., entangled photons, such that when the encryption module 202 reads or measures the particles received over the first quantum communication channel to generate the first quantum encryption key, the decryption module 204 reads or measures the corresponding particles received over the second quantum communication channel to generate the second quantum encryption key. For instance, the decryption module 204 may determine that photons transmitted over the second communication channel have been disentangled from their corresponding entangled photons transmitted to the first device, which may indicate that the encryption module 202 is reading the quantum information transmitted over the first quantum communication channel to generate an encryption key. In such an embodiment, the decryption module 204 may buffer quantum information received over the second quantum communication channel so that qubits are not missed or skipped while the decryption module 204 determines that the encryption module 202 is reading the quantum information at the first device.

In this manner, the same quantum encryption key can be generated on the first and second devices without requiring the encryption key, or encryption key information, to be shared between the first and second devices. Furthermore, because the quantum encryption keys are generated dynamically when data is ready to by encrypted on the first device, new quantum encryption keys can be generated for each piece of data that is being transmitted from the first device to the second device so that the quantum encryption keys are not reused.

In one embodiment, the encryption module 202 transmits the encrypted data to the second device over a standard communication channel that is separate from the quantum communication channels that are used to transmit the quantum information. The standard communication channel, for example, may include a standard network connection such as the Internet, an intranet, a local area network, a wide area network, and/or the like. Even if an eavesdropper were to intercept the encrypted data, the eavesdropper would not be able to decrypt the encrypted data because the encryption key or other key information was not sent with the encrypted data, prior to sending the encrypted data, or after the encrypted data was sent. The decryption module 204, however, can decrypt the encrypted data because it has independently generated the second encryption key, which is the same as the first encryption key, at the second device using the quantum information received over the second quantum communication channel.

The termination module 206, in one embodiment, is configured to prevent access to the decrypted data after a predetermined period of time. For example, the termination module 206 may detect when the decryption module 204 successfully decrypts the encrypted data, and may begin a timer for the predetermined period of time. After expiration of the predetermined period of time, the termination module 206 prevents access to the decrypted data so that it cannot be read, modified, displayed, copied, and/or the like.

In certain embodiments, the termination module 206 prevents access to the decrypted data after a predetermined time period by deleting the decrypted data, by marking the decrypted data as deleted or as data that should be deleted (e.g., by a later garbage collection process), by overwriting the decrypted data, and/or the like. The predetermined period of time may be set by default, e.g., thirty seconds, one minute, five, minutes, an hour, or the like. The predetermined period of time may also be configurable by a user. In certain embodiments, the predetermined period of time may be determined according to the type of data that is being accessed. For instance, an image may be accessible for a shorted period of time than a text file.

In some embodiments, the decrypted data is accessed or presented on the second device, and the termination module 206 prevents access to the decrypted data on the second device after the predetermined period of time. In further embodiments, the decrypted data is sent to one or more third devices that include the termination module 206, and the termination module 206 prevents access to the decrypted data on the third devices after the predetermined period of time. For instance, the second device may act as a server for temporarily storing and transmitting the decrypted data to one or more third devices that request the decrypted data, as explained in more detail below with reference to FIGS. 3A and 3B.

In one embodiment, the termination module 206 is further configured to cease transmission of the quantum information over the first and second quantum communication channels after the predetermined period of time. For example, the termination module 206 may send a signal to the quantum computing device to shut down the quantum communication channel, may call a function via an application programming interface ("API") provided by the quantum computing device to shut down the quantum communication channel, and/or the like.

In certain embodiments, the termination module 206 prevents access to the first and second quantum encryption keys after the first and second encryption keys are used to encrypt and decrypt data on the first and second devices. In further embodiments, the termination module 206 prevents access to the first and second quantum encryption keys on the first and second devices by deleting the quantum encryption keys on the first and second devices, by marking the quantum encryption keys as deleted, but overwriting the quantum encryption keys on the first and second devices with different data, and/or the like.

In certain embodiments, the termination module 206 (e.g., the code, functions, instructions, and/or the like that make up at least a portion of the termination module 206) may be stored in a trusted area of the second device, e.g., a trusted platform module or another similar secure area, so that the termination module 206 cannot be compromised by hackers or the like.

In one embodiment, the error module 208 is configured to detect an error in the quantum information transmitted over one of the first and second quantum communication channels. As discussed above, detecting an error in the quantum information that is transmitted to the first and second devices may indicate that quantum information transmitted over one of the first and second quantum communication channels has been misappropriated. In other words, the error module 208 detects that an unauthorized third-party is eavesdropping on the quantum communication channel in an attempt to intercept the quantum encryption key.

In an embodiment where the quantum information comprises entangled particles, e.g., entangled photon particles, that are sent to both the first and second devices over the first and second quantum communication channels, respectively, the error module 208 detects when the quantum information is disturbed by an eavesdropper reading or measuring the quantum information prior to it reaching the first and/or second devices. In certain embodiments, the error module 208 compares portions of the quantum encryption keys received at the first and second devices to determine whether the quantum encryption keys match. If the error module 208 determines that the compared portions of the quantum encryption keys don't match, then it can be determined that an eavesdropper read or measured the quantum information in an attempt to intercept the quantum encryption key data over the first and/or second quantum communication channels. In such an embodiment, the error module 208 deletes the generated quantum encryption keys, and sends an error notification to alert users that an eavesdropper may be present in the system.

Figure 3A:
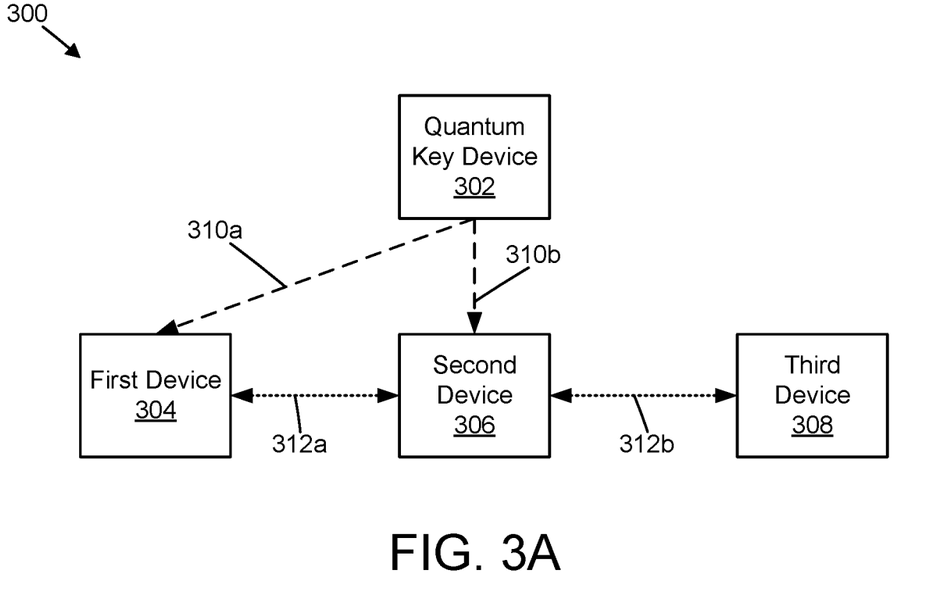
FIG. 3A is a schematic block diagram of a system for quantum-based data encryption, according to one or more examples of the present disclosure.

FIG. 3A depicts one embodiment of a system 300 for quantum-based data encryption. In one embodiment, the system 300 includes a quantum key device 302, a first device 304, a second device 306, and a third device 308. The quantum key device 302, in certain embodiments, is communicatively coupled to the first device 304 and the second device 306 over a first quantum communication channel 310a and a second quantum communication channel 310b, respectively. In some embodiments, the first device 304 is communicatively coupled to the second device 306 over a standard communication channel 312a, such as the Internet or similar network connection. Similarly, the second device 306 may be coupled to a third device 308 over a standard communication channel 312b, such as the Internet or similar conventional network connection.

In one embodiment, the encryption module 202 is located on the first device 304 and encrypts data on the first device 304 using quantum information received over the first quantum communication channel 310a. As described above, the quantum information may include entangled particles, e.g., photons, that are generated and transmitted by the quantum key device 302, and received at the first device 304 using quantum computing components configured to receive, interpret, and/or process the received entangled particles. The encryption module 202 may read or measure the received quantum information and encode it, e.g., create a series of ones and zeroes, to generate an encryption key for encrypting data that is being sent from the first device 304 to the second device 306.

In one embodiment, the decryption module 204 is located on the second device 306 and also receives a stream of quantum information over the second quantum communication channel 310b that corresponds to the stream of quantum information received at the first device 304 over the first quantum communication channel 310a. The quantum information, for instance, may include entangled particles that correspond to the entangled particles that are received at the first device 304 over the first quantum communication channel 310a. In certain embodiments, when the encryption module 202 reads or measures an entangled particle received at the first device 304 over the first quantum communication channel 310a, the decryption module 204 can determine the state or value of the entangled particle received at the second device 306 that corresponds to the entangled particle that the encryption module 202 reads at the first device 304 (due to the physical phenomenon of quantum entanglement).

In this manner, the encryption module 202 generates a first encryption key on the first device 304 and the decryption module 204 generates a second encryption key on the second device 306 that is the same as the first encryption key without sharing encryption key information between the first device 304 and the second device 306. The encryption module 202 may encrypt data with the first encryption key and send the encrypted data to the second device 306 over a standard communication channel 312a, e.g., the Internet or another conventional communication channel. The decryption module 204 may decrypt the encrypted data received at the second device 306 using the second encryption key.

In further embodiments, the second device 306 sends the decrypted data to a third device 308. In such an embodiment, the second device 306 may act as a central server for distributing decrypted data to multiple different third devices 308, e.g., client devices such as users' smart phones. The third device 308 may use the decrypted data for a predetermined period of time, which may be set by the termination module 206. For example, the termination module 206 may set the predetermined period of time to thirty seconds, one minute, five minutes, and/or the like. The predetermined amount of time may be configurable by a user, and/or may depend on the type of the decrypted data. For example, the predetermined amount of time may be shorter for image data than for text files.

After the predetermined period of time is expired, the termination module 206 prevents access to the decrypted data on the third device 308. For instance, the termination module 206 may delete the decrypted data on the third device 308, may overwrite the decrypted data with different data on the third device 308, may mark or flag the decrypted data as deleted on the third device 308, and/or the like. In this manner, the decrypted data is only available for a predetermined period of time, at which point the termination module 206 makes the decrypted data inaccessible.

In an illustrative example, an image may be captured with a camera on the first device 304. The encryption module 202 may generate a first encryption key using quantum information, e.g., entangled photons, that are received over the first quantum communication channel 310a from the quantum key device 302. When the encryption module 202 begins reading or measuring the entangled photons, this may cause the entangled photons to be disentangled. In other words, when the state of an entangled photon is read, the state of the corresponding photon(s) that it is entangled with can also be determined. In one embodiment, this occurs at the second device 306.

In certain embodiments, when the encryption module 202 reads the entangled photons at the first device 304 to generate the first encryption key, the decryption module 204 at the second device 306 generates the second encryption key using the disentangled photons received over the second quantum communication channel 310b. For example, the decryption module 204 may detect that the photons of the quantum information have been disentangled (e.g., because their state is known), and may determine that the encryption module 202 is generating an encryption key. The encryption module 202 may then encrypt the image data using the first encryption key, and the encrypted image is transmitted to the second device 306 over the standard communication channel 312a.

The decryption module 204 decrypts the encrypted image at the second device 306 using the second encryption key, and transmits the decrypted image to the third device 308, where it is accessible for a predetermined period of time. After expiration of the predetermined period of time, the termination module 206 prevents access to the decrypted image so that it cannot be accessed, displayed, copied, modified, and/or the like, on the first device 304, the second device 306, and/or the third device 308.

Figure 3B:
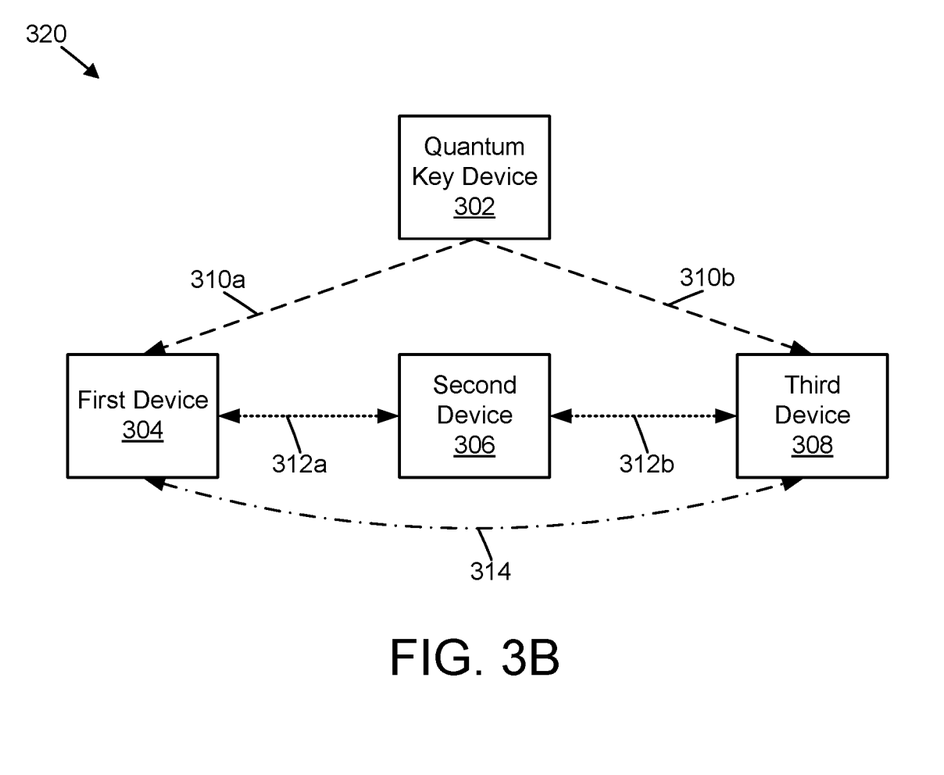
FIG. 3B is a schematic block diagram of a system for quantum-based data encryption, according to one or more examples of the present disclosure.

FIG. 3B depicts another embodiment of a system 320 for quantum-based data encryption. The system 320 depicted in FIG. 3B may be substantially similar to the system 300 depicted in FIG. 3A. The system 320 in FIG. 3B depicts the quantum key device 302 being communicatively coupled to the third device 308 over the second quantum communication channel 310b instead of the second device 306, as depicted in FIG. 3A.

In such an embodiment, the decryption module 204 may be located on the third device 308 to generate the second encryption key using the quantum information received over the second quantum communication channel 310b, and decrypt encrypted data that is received at the third device 308 from the second device 306, over a standard communication channel 312b. In such an embodiment, the second device 306 may act as a central server that distributes encrypted data to multiple third devices 308, e.g., users' smart phones. In certain embodiment, the encrypted data may be transmitted from the first device 304 directly to the third device 308 over a different communication channel 314 that communicatively couples the first device 304 to the third device 308. As with the system 300 depicted in FIG. 3A, the termination module 206 may prevent access to the decrypted data at the third device 308 after a predetermined period of time.

Figure 4:
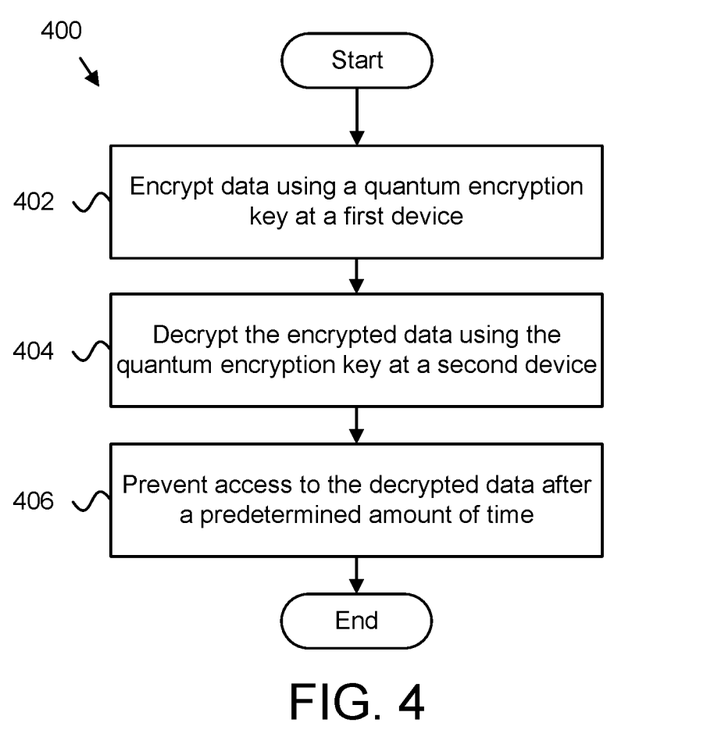
FIG. 4 is a schematic flow diagram of a method for quantum-based data encryption, according to one or more examples of the present disclosure.

FIG. 4 is a schematic flow-chart diagram illustrating one embodiment of a method 400 for quantum-based data encryption. In one embodiment, the method 400 begins, and encrypts 402 data to create encrypted data, at a first device, using a first quantum encryption key. The first quantum encryption key, in further embodiments, is derived at the first device from quantum information received over a first quantum communication channel from a quantum key device. The first device, in certain embodiments, is communicatively coupled to the quantum key device over the first quantum communication channel.

In one embodiment, the method 400 decrypts 404 the encrypted data to create decrypted data, at a second device, using a second quantum encryption key. In some embodiments, the second quantum encryption key is derived at the second device from quantum information received over a second quantum communication channel. In certain embodiments, the second device is communicatively coupled to the quantum key device over the second quantum communication channel. In various embodiments, the first quantum encryption key is the same as the second quantum encryption key.

In some embodiments, the method 400 prevents 406 access to the decrypted data after a predetermined period of time, and the method 400 ends. In certain embodiments, the encryption module 202, the decryption module 204, and the termination module 206 perform the various steps of the method 400.

Figure 5:
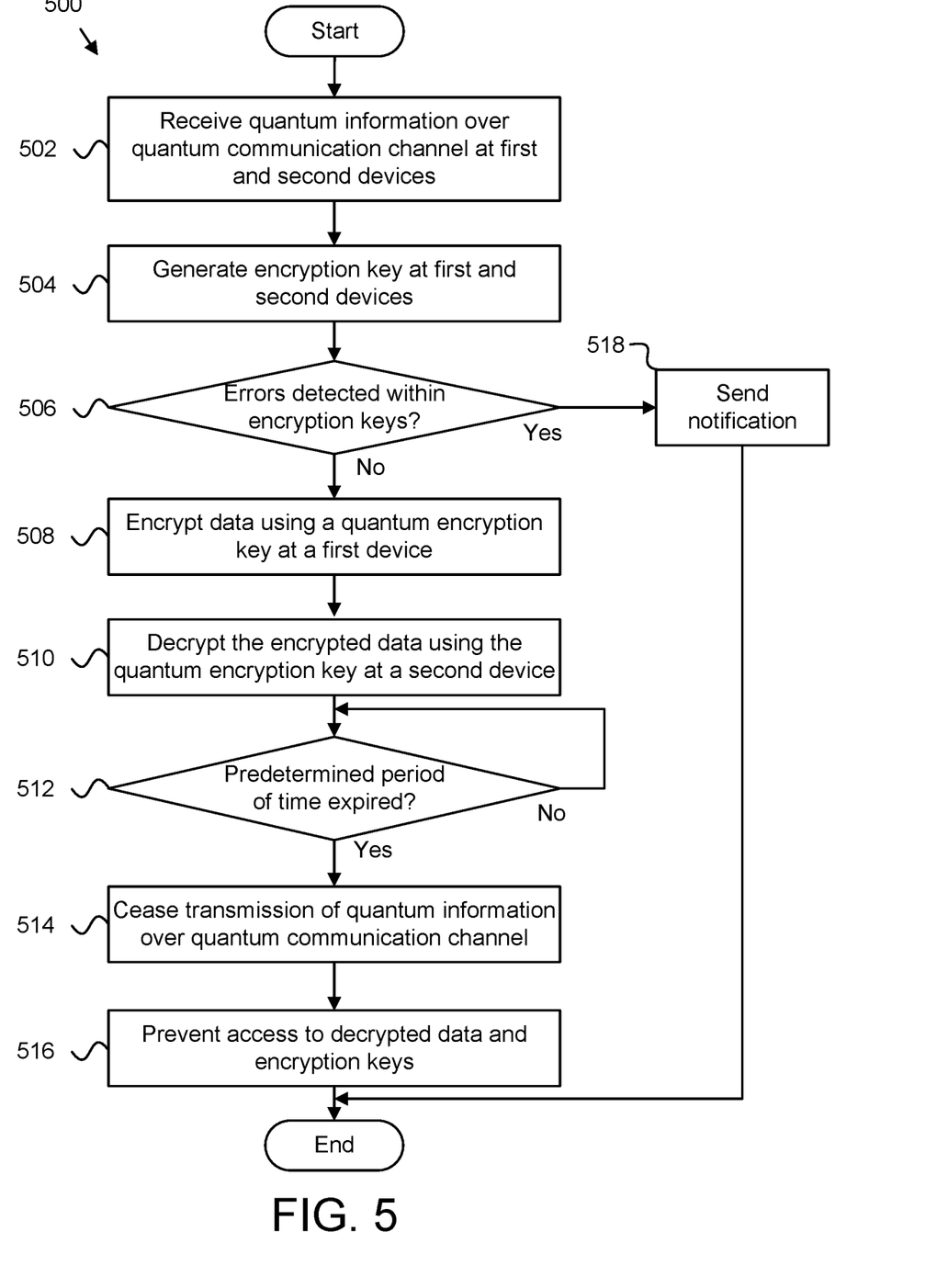
FIG. 5 is a schematic flow diagram of a method for quantum-based data encryption, according to one or more examples of the present disclosure.

FIG. 5 is a schematic flow-chart diagram illustrating one embodiment of a method 500 for quantum-based data encryption. In one embodiment, the method 500 begins and receives 502 quantum information, e.g., entangled photons, over first and second quantum communication channels at first and second devices. In certain embodiments, the method 500 generates 504 first and second encryption keys at the first and second devices, respectively, based on the quantum information.

In further embodiments, the method 500 determines 506 whether there are errors in the first and second encryption keys. For instance, portions of the first and second encryption keys may be compared to determine whether the portions correspond to each other. If errors are present, the method 500 may determine that an eavesdropper has attempted to intercept the encryption key information, e.g., the quantum information transmitted over the first and/or second quantum communication channels. In such an embodiment, the method 500 sends 518 a notification that there are errors in the first and second encryption keys and that the first and second encryption keys should be discarded.

Otherwise, in one embodiment, the method 500 encrypts 508 data at the first device using the first quantum encryption key. In further embodiments, the method 500 transmits the encrypted data to the second device, and decrypts 510 the encrypted data using the second encryption key generated at the second device. The method 500, in certain embodiments, determines 512 whether a predetermined period of time for accessing the decrypted data has expired. If not, in some embodiments, the method 500 continues to monitor the time period to determine 512 when the predetermined period of time has expired.

Otherwise, in one embodiment, the method 500 ceases 514, or causes the ceasing of, quantum information transmissions from the quantum key device to the first and second devices over the first and second quantum communication channels. In further embodiments, the method 500 prevents 516 access to the decrypted data and/or the first and second encryption keys in response to the predetermined period of time expiring, and the method 500 ends. In certain embodiments, the encryption module 202, the decryption module 204, the termination module 206, and the error module 208 perform the various steps of the method 500.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in code and/or software, the code and/or software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system, comprising:
a quantum key device configured to generate quantum information and transmit the quantum information over a first quantum communication channel and a second quantum communication channel;
a first device communicatively coupled to the quantum key device over the first quantum communication channel;
a second device communicatively coupled to the quantum key device over the second quantum communication channel;
an encryption module configured to encrypt data to create encrypted data, at the first device, using a first quantum encryption key, the first quantum encryption key derived at the first device from quantum information received over the first quantum communication channel;
a decryption module configured to decrypt the encrypted data to create decrypted data, at the second device, using a second quantum encryption key, the second quantum encryption key derived at the second device from quantum information received over the second quantum communication channel, the first quantum encryption key is the same as the second quantum encryption key; and
a termination module configured to:
prevent access to the decrypted data after a predetermined period of time, the predetermined period of time determined according to a type of the decrypted data; and
prevent derivation of encryption keys by ceasing transmission of the quantum information over the first and second quantum communication channels after the predetermined period of time,
wherein at least a portion of the modules comprise one or more of hardware circuits, programmable hardware devices, and executable code, the executable code stored on one or more computer readable storage media.

2. The system according to claim 1, further comprising a third device communicatively coupled to the second device, wherein:

the decrypted data is transmittable to the third device from the second device; and the decrypted data is accessible on the third device for the predetermined period of time.

3. The system according to claim 1, wherein the encrypted data is transmitted over a standard communication channel that is separate from the first and second quantum communication channels.

4. The system according to claim 1, wherein the termination module prevents access to the decrypted data after the predetermined period of time by deleting the decrypted data.

5. The system according to claim 1, wherein the termination module prevents access to the decrypted data after the predetermined period of time by overwriting the decrypted data with different data.

6. The system according to claim 1, wherein the quantum information comprises a stream of entangled quantum particles such that when a state of a quantum particle of an entangled set of quantum particles is read, corresponding states of other quantum particles in the entangled set of quantum particles are determinable.

7. The system according to claim 1, wherein the termination module is further configured to prevent access to the first and second quantum encryption keys after the first and second quantum encryption keys are used to create the encrypted data and decrypt the encrypted data on the first and second devices, the termination module overwriting at least a portion of the first and second quantum encryption keys.

8. The system according to claim 1, further comprising an error module configured to detect an error in the quantum information transmitted over one of the first and second quantum communication channels, the error indicating that the quantum information transmitted over one of the first and second quantum communication channels has been misappropriated.

9. The system according to claim 8, wherein the error module detects an error in the quantum information received at one of the first and second devices over the first and second quantum communication channels by comparing at least a portion of the first and second quantum encryption keys.

10. An apparatus, comprising:
an encryption module configured to encrypt data to create encrypted data, at a first device, using a first quantum encryption key, the first quantum encryption key derived at the first device from quantum information received over a first quantum communication channel from a quantum key device, the first device communicatively coupled to the quantum key device over the first quantum communication channel;
a decryption module configured to decrypt the encrypted data to create decrypted data, at a second device, using a second quantum encryption key, the second quantum encryption key derived at the second device from quantum information received over a second quantum communication channel, the second device communicatively coupled to the quantum key device over the second quantum communication channel, the first quantum encryption key is the same as the second quantum encryption key; and
a termination module configured to:
prevent access to the decrypted data after a predetermined period of time, the predetermined period of time determined according to a type of the decrypted data; and
prevent derivation of encryption keys by ceasing transmission of the quantum information over the first and second quantum communication channels after the predetermined period of time.

11. The apparatus according to claim 10, wherein:
the decrypted data is transmittable to a third device that is communicatively coupled to the second device; and
the decrypted data is accessible on the third device for the predetermined period of time.

12. The apparatus according to claim 10, wherein the encrypted data is transmitted over a standard communication channel that is separate from the first and second quantum communication channels.

13. The apparatus according to claim 10, wherein the termination module prevents access to the decrypted data after the predetermined period of time by one of:
deleting the decrypted data; and
overwriting the decrypted data with different data.

14. The apparatus according to claim 10, wherein the decrypted data is stored in volatile memory while the decrypted data is used without storing the decrypted data in non-volatile memory.

15. The apparatus according to claim 10, wherein the termination module is further configured to prevent access to the first and second quantum encryption keys after the first and second quantum encryption keys are used to create the encrypted data and decrypt the encrypted data on the first and second devices, the termination module overwriting at least a portion of the first and second quantum encryption keys.

16. The apparatus according to claim 10, further comprising an error module configured to detect an error in the quantum information transmitted over one of the first and second quantum communication channels, the error indicating that the quantum information transmitted over one of the first and second quantum communication channels has been misappropriated.

17. The apparatus according to claim 16, wherein the error module detects an error in the quantum information received at one of the first and second devices over the first and second quantum communication channels by comparing at least a portion of the first and second quantum encryption keys.

18. A method, comprising:
encrypting data to create encrypted data, at a first device, using a first quantum encryption key, the first quantum encryption key derived at the first device from quantum information received over a first quantum communication channel from a quantum key device, the first device communicatively coupled to the quantum key device over the first quantum communication channel;
decrypting the encrypted data to create decrypted data, at a second device, using a second quantum encryption key, the second quantum encryption key derived at the second device from quantum information received over a second quantum communication channel, the second device communicatively coupled to the quantum key device over the second quantum communication channel, the first quantum encryption key is the same as the second quantum encryption key;
preventing access to the decrypted data after a predetermined period of time, the predetermined period of time determined according to a type of the decrypted data; and
prevent derivation of encryption keys by ceasing transmission of the quantum information over the first and second quantum communication channels after the predetermined period of time.

\* \* \* \* \*